(12) United States Patent
VanRiper et al.

(10) Patent No.: US 7,774,297 B2
(45) Date of Patent: Aug. 10, 2010

(54) SYSTEM AND METHOD FOR NETWORK SECURITY

(75) Inventors: Ryan A. VanRiper, Maple Grove, MN (US); David Musliner, Plymouth, MN (US); Christopher W. Geib, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 804 days.

(21) Appl. No.: 11/323,313

(22) Filed: Dec. 30, 2005

(65) Prior Publication Data

US 2007/0156666 A1    Jul. 5, 2007

(51) Int. Cl.
    *G06F 17/30* (2006.01)
(52) U.S. Cl. .............................. 707/204; 707/3; 707/10
(58) Field of Classification Search ........................ None
    See application file for complete search history.

(56) References Cited

U.S. PATENT DOCUMENTS

| 4,910,728 | A   | * | 3/1990  | Dechene ..................... 370/242 |
| 6,654,787 | B1  | * | 11/2003 | Aronson et al. ............. 709/206 |
| 2004/0088561 | A1 | * | 5/2004 | Dettinger et al. ............ 713/200 |
| 2005/0283837 | A1 | * | 12/2005 | Olivier et al. ................. 726/24 |
| 2006/0265747 | A1 | * | 11/2006 | Judge ............................ 726/22 |

OTHER PUBLICATIONS

Kreibich, Christian, et al., "Honeycomb—Creating Intrusion Detection Signatures Using Honeypots", *ACM SIGCOMM Computer Communications Review*, vol. 34, No. 1,(Jan. 2004),51-56.

Liu, Peng, "DAIS: A Real-time Data Attack Isolation System for commercial Database Applications", *Computer security Applications Conference*, 2001, ACSAC 2001, Proceedings 17th Annual Dec.10-14, 2001, Piscataway, NJ,(Dec. 10, 2001),1-11.

White, Steve R., et al., "Anatomy of a Commercial-Grade Immune System", *Internet Citation*, URL:http://www.research.ibm.com/antivirus/SciPapers/White/Anatomy/Anatomy.pd,(Jun. 1999),1-28.

Yeldi, Sujata, et al., "Enhancing Network Intrusion Detection System With Honeypot", *IEEE TENCON* 2003. Conference On Convergent Technologies for the Asia-Pacific Region, Bangalore, India, Oct. 15-17, 2003,1521-1526.

* cited by examiner

*Primary Examiner*—Baoquoc N To
(74) *Attorney, Agent, or Firm*—Schwegman, Lundberg & Woessner, P.A.

(57) ABSTRACT

A system and method analyzes queries in a computer network, and identifies problem-causing queries that could be harmful to the system. If a query does not match any queries in a database, the query is transmitted to its destination. If a query matches a query in the database, that query is blocked from transmission to the destination. If a query is transmitted to its destination, and it is later determined that query caused a problem on that destination, that query is added to the database of queries. In one embodiment, a query that does not cause any problems is written to a pool of current up-to-date backup databases that may be used if the main system goes down. In another embodiment, the system tests variants of a query that caused a problem at the destination to attempt to discover other queries that could cause a problem.

20 Claims, 3 Drawing Sheets

SYSTEM AND METHOD FOR NETWORK SECURITY

Embodiments of the invention were developed in part with funds from the United States government. This invention was made with Government support under Contract FA8750-04-C-0253 awarded by the Air Force. The government has certain rights in this invention.

TECHNICAL FIELD

Various embodiments relate to computer network security, and in an embodiment, but not by way of limitation, to self-diagnostic and regenerative security in computer network systems.

BACKGROUND

While much attention is paid to breaches of computer and network systems in both the lay and technical presses, such breaches of security are not altogether new, and indeed have been around since the inception of computer networks. To counter such security breaches, many systems, especially on the server side, install firewalls to prevent harmful content from entering the system. While helpful, such firewalls and related software and tools take up precious resources on the server side, and lack the ability to evolve and learn from attacks on the system.

The art is therefore in need of a different approach for protecting the integrity of computer network systems.

SUMMARY

In one or more embodiments, a proxy server is installed between a system from which a message or query originates and a system to which such a message or query is destined. The proxy server receives the query, and checks that query against a database of queries that are known to have caused problems on the receiving system in the past. If the query is not in the database, the proxy server transmits the query to the receiving system. After sending the query, the proxy server determines if the query did or did not cause a problem on the receiving system. If it did not cause a problem, that query may be saved in a backup database. If the query did cause a problem, the system will test, experiment with, and analyze the query in an attempt to learn from that query, so that the system can potentially avoid other problems in the future.

DETAILED DESCRIPTION

Figure 1:
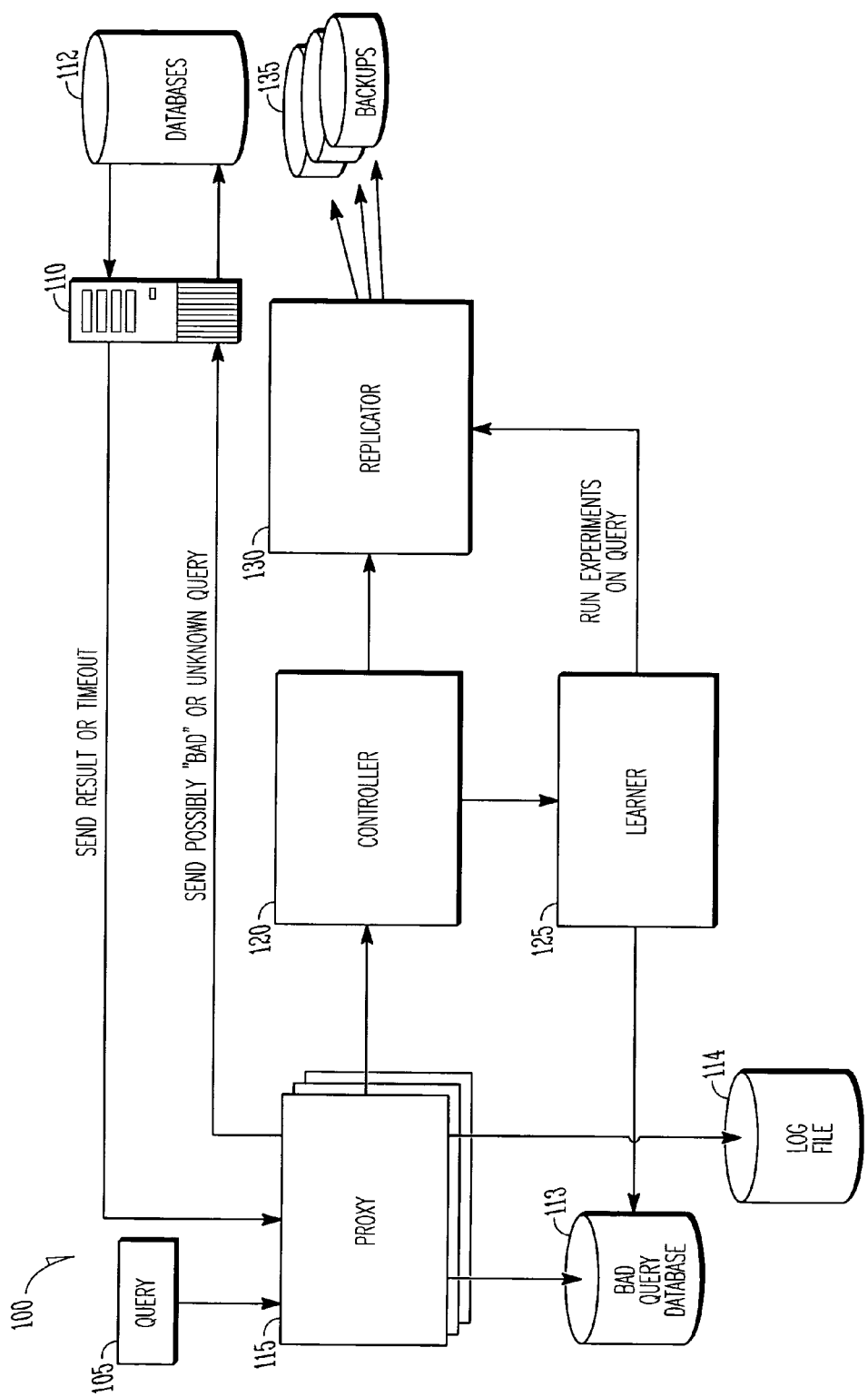
FIG. 1 illustrates an example embodiment of a computer network security system.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 illustrates an example embodiment of a system architecture 100 that provides security to computer systems and networks. The security provided by the system 100 may protect databases, servers, or any other component of a system or network. The embodiment of FIG. 1 is directed to a client-server system, but embodiments of the invention are not limited to client-server systems. For example, other embodiments may involve system architectures such as peer-to-peer systems. However, for ease of explanation and understanding, the present invention will be herein described in relation to a client-server system.

Referring specifically to the embodiment of FIG. 1, the system 100 includes a client system 105 and a server system 110. The client system 105 may send a query to the server system 110. The server system 110 has access to one or more databases 112. The server system 110 may be an E-commerce server site, a database for an email system, or another type of server site that can be part of a network. That is, embodiments are not limited to the protection of databases, but may protect any service such as email, web, domain-name servers, or any complete groups or combinations of services or E-commerce sites. A proxy server 115 may reside between the client machine 105 and the server system 110. The proxy server 115 has access to a database 113 of queries that have previously caused problems in the system 100, and a log file 114 that records the traffic that passes through the proxy server 115. The proxy server 115 may further be coupled to a controller module 120 and a learner module 125. In at least one embodiment, the controller module 120 and the learner module 125 may be coupled to each other. The controller module 120 and the learner module 125 may further be coupled to a replicator module 130. The replicator module 130 may be coupled to backup databases 135. The backup databases 135 mirror the databases 112 associated with the server system 110.

Figure 2:
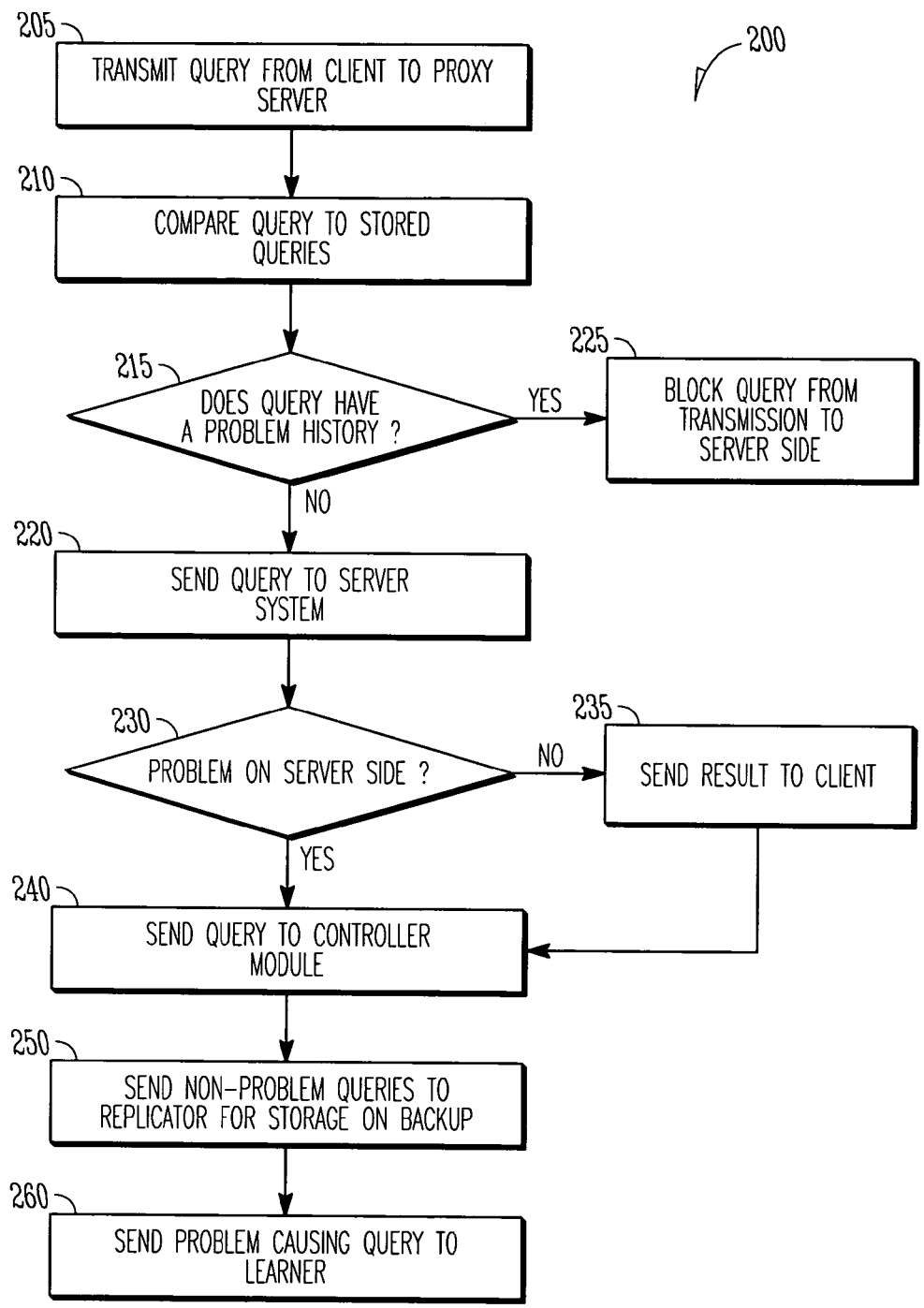
FIG. 2 illustrates an example embodiment of a method to prevent the transmission of potentially harmful queries or messages in a computer network.

FIG. 2 illustrates an embodiment of a process 200 that provides security to the system 100 of FIG. 1. All requests from the client side such as client system 105 are transmitted through the proxy server 115 at operation 205 before being transmitted to the server system 110. The proxy server 115 receives the query from the client system, and at operation 210 compares the query against queries that are stored in the problem-causing query database 113. When a proxy server is initially implemented, it has no prior history and the problem-causing query file 113 is empty. If the system 100 determines that the query is not a problem-causing query at operation 215, i.e., the present query is not in the problem-causing query file 113, the proxy server sends that query to the server system 110 at operation 220.

If the incoming query is found in the problem-causing query database 113, the proxy server 115 at operation 225 blocks the query from being sent to the server system 110. In an embodiment, a message is sent to the client system 105 informing the client system as to the action taken by the proxy server 115.

The server system 110 receives a query and acts upon it. In an embodiment, the proxy server 115 will receive from the server system 110 either a response from the query or a timeout. If the proxy server 115 receives a response from the server system 110 at operation 230, the proxy server 115 may conclude that the query did not cause a problem on the server system 110, and at operation 235 may transmit the results of the query to the client machine 105. However, if the proxy server 115 receives a timeout from the server system 110, the proxy server 115 may conclude that the query caused a problem on the server system 110. This problem could be in the server itself, the database on the server side, or some other component of the server system. In another embodiment, after the proxy server 115 sends a query to the server system 110, the proxy server 115 then sends a message to the server system 110 to see if the server system is still up and running. In this embodiment, the proxy server 115 can use the results/response of this test message to determine if the server system 110 has had a problem.

After determining whether the query did or did not cause problems on the server system 110, the proxy server 115 at operation 240 transmits the query to the controller module 120. In an embodiment, the controller module 120 has several functions. A first function at operation 250 sends queries that caused no problems on the server system 110 to the replicator module 130. The replicator module 130 replicates these non-problem-causing queries by writing them to the backup database 135. In this way, the backup database 135 mirrors the server system database 112.

The backup database 135 is used by the system 100 if the server system 110 ever fails (whether it is the result of a problem-causing query or some other reason). If the server system 110 fails, the proxy server 115 detects this failure, and it sends a message to the controller module 120. The controller module 120 then switches the TCP connection for the server system 110 to one of the backup databases 135, and informs the proxy server 115 of this new connection. Thereafter, when a new query comes into the system 100, the TCP address for the backup system is available to the proxy server 115, and the proxy server 115 sends the new query onto the backup system. The proxy server 115 treats the backup just as the original server system, and screens for problem-causing queries before sending the message to the backup system.

If the query caused a problem on the server system 110, the controller module 120 at operation 260 sends this problem-causing query to the learner module 125. In one embodiment, the learner module 125 analyzes the problem-causing query to determine if it can identify any hex patterns that may also cause a server system to experience problems. The learner server 125 does this by executing one or more test processes that are, in an embodiment, created by the controller 120 or the replicator 130. These test processes are meant to imitate server systems, so that if the test system has a problem with a generated query, it may be assumed that the server system would have a problem with such a query. In an embodiment, the learner server 125 reads training data, experimenting on that data with the problem-causing query, and generating rules that may be applied to future queries. For example, a certain byte of the query may have caused the problem on the server system. If that is the case, the learner module 125 may try different values for that byte in a test program to determine if these other values in that byte position may cause a problem on a server system. If other queries or data are found to be a potential problem by the learner module 125, rules are generated, and these rules are sent to the problem causing database 113. Thereafter, if the same query that caused a problem in this testing enters the proxy server 115, that query will be blocked from transmission to the server system 110.

The following is a specific example of an attack on a network and system, the effects of that attack, and a manner in which an embodiment of the invention may deal with that attack.

For example, MySQL version 3.23.49 is vulnerable to attacks that set the password of a user account to a string length greater then 255. Consequently, if a known user logs on, creates a large password, and then sets the new password, this will cause the MySQL server to overflow the buffer used to store a user password and crash the MySQL—thereby creating a denial of service (DOS). To further illustrate this potential problem, the following SQL commands (to create a large password from random characters and prepare the password field) are considered:

1. "ALTER TABLE user CHANGE COLUMN Password LONGTEXT" (find the user to exploit—in this case the superuser account root)
2. "SELECT user FROM mysql.user WHERE user!='root'LIMIT 0,1" (the new big password and the user to be targeted is now updated)
3. "UPDATE user SET Password="bigsetofrandomchars" (now commit all the changes to crash the server)
4. "FLUSH PRIVILEDGES"

When CORTEX is running the attacker would connect to the proxy server and begin with step 1 of the attack working its way through each step until the end. The proxy will take each command and check to see if this command caused the MySQL server to fail or not. If it did cause harm to the system then the query is dropped immediately. If not it will take each command and send it to a tester module and then test if there were any bad effects of the command to the MySQL server. In this case, using the example, the first query will come into the proxy server, search its current set of rules, and find that it has not seen this query before. The proxy server will then send this query to the tester module and see what effect it has on the MySQL server. This process will happen the same way for the first two commands in the set of four commands. When it encounters the third command (the update), it will cause the server to crash. CORTEX will take the exact command and write it to a log file that the proxy server uses to detect future attacks like this. The update query will be sent to the controller telling it what query was bad. The controller having a model of threats to the system will choose to take several actions. Those actions will be to first send the bad query to the learning system which will try and generalize the bad query for possibly more bad queries that are slightly different but have the same effect. In this case, since the size of the password buffer is being exploited, the learning system will ask the replicator component for a test MySQL database on which to test its hypotheses. In parallel with this action, the controller will send a message to the replicator as well, and ask it to switch to a backup MySQL from the pool of available servers so CORTEX can continue to service queries (i.e., the fourth command in the attack sequence). The replicator will then switch to a new lead MySQL server, and inform the proxy server that from now on send all queries to this new test module instead of the old broken one. The replicator, after completing the switch, will then remove the bad MYSQL server from the pool and rebuild it using the most up to date copy from the pool of available servers. The learning component, as it completes each experiment, will incrementally update the log file that the proxy server uses. The learner will use a binary search to try to determine what a valid password length should be. As it narrows the set of possible password lengths, the proxy server log file will be updated.

This is an example of how each query flows through CORTEX, and the choices it may make. If the exact same set of commands were run once again after the learning was complete, CORTEX will only process the first two commands. As soon as it saw the third command, it would match the proxy server log file, immediately drop the query, and prevent the lead MySQL test module from going offline. The result is that the system has the ability to learn, detect zero day attacks (attacks that have not been seen before), recover from the attack by rebuilding the damaged server, prevent the exact same attack, and possibly prevent a large set of generalized variants of the attack in the future.

Figure 3:
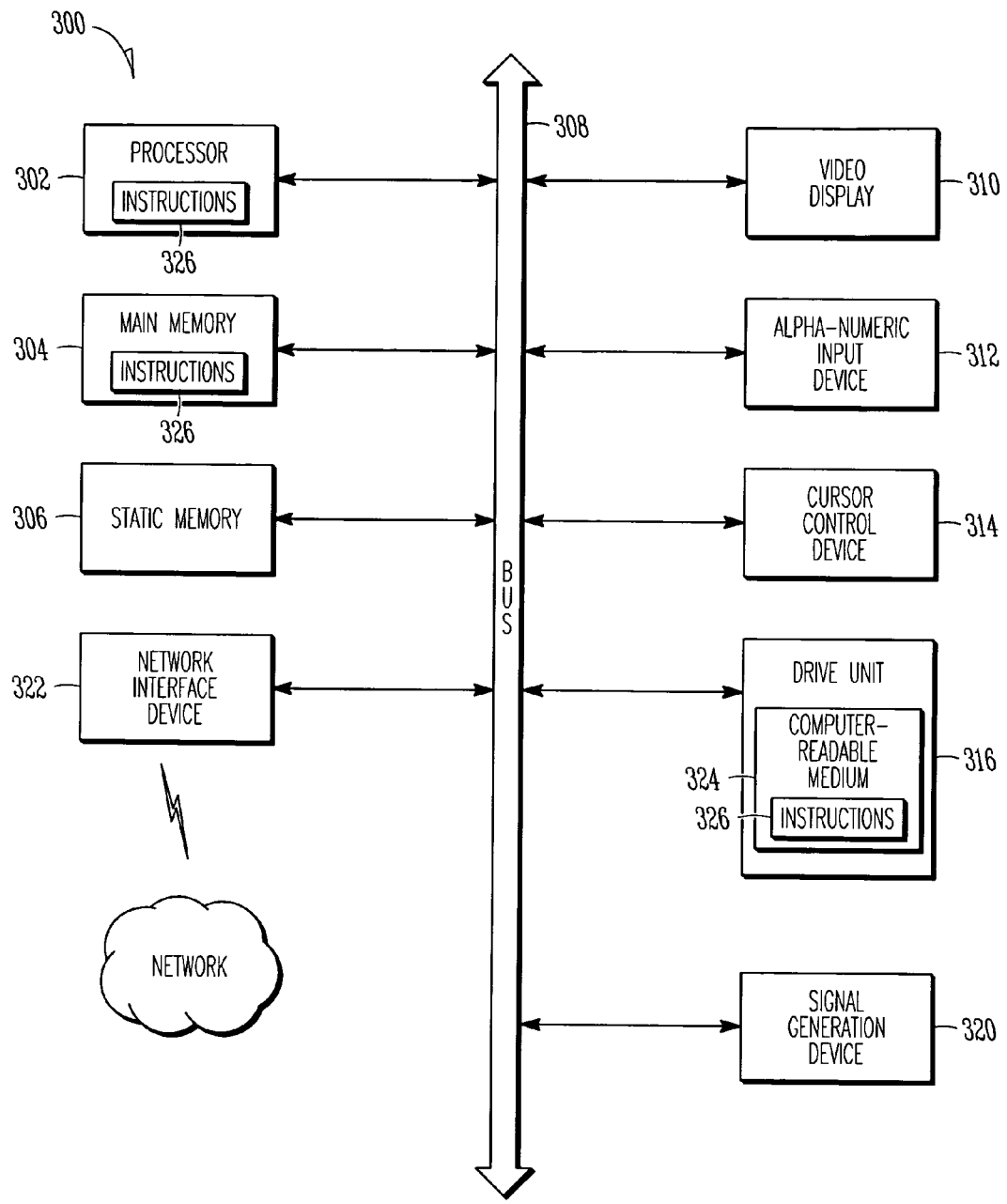
FIG. 3 illustrates an example embodiment of a computer system upon which an embodiment of the present invention may operate.

FIG. 3 shows a diagrammatic representation of a machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alpha-numeric input device 312 (e.g. a keyboard), a cursor control device 314 (e.g. a mouse), a disk drive unit 316, a signal generation device 320 (e.g. a speaker) and a network interface device 322.

The disk drive unit 316 includes a machine-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "machine-readable medium" shall be taken to include various tangible media that are capable of storing or encoding a sequence of instructions for execution by the machine and that cause the machine to perform any one of the methodologies of the present invention. The term "machine-readable medium" shall accordingly be taken to include, but not be limited to, solid-state memories, and optical and magnetic disks.

Thus, a system and method for network security has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. A method comprising:
   receiving a query from a first system;
   comparing the query against a database of queries;
   transmitting the query to a second system if the query is not found in the database of queries;
   writing the query to a backup system if the query is not found in the database of queries;
   blocking the transmission of the query to the second system if the query is found in the database of queries;
   analyzing the query when the query causes a problem on the second system; and
   generating rules relating to the query.

2. The method of claim 1, wherein the database of queries comprises one or more queries that at a prior time caused a problem on the second system.

3. The method of claim 1, wherein the first system is a client system and the second system is a server system.

4. The method of claim 3, wherein the second system comprises an electronic mail system.

5. The method of claim 1, further comprising monitoring the second system to determine if the second system experiences a problem after receiving the query.

6. The method of claim 5, further comprising writing the query to the database of queries if the second system experiences a problem after receiving the query.

7. The method of claim 6, further comprising invoking a backup system if the second system experiences a problem.

8. The method of claim 1, wherein comparing the query against the database of queries comprises checking one or more hex patterns of the query against hex patterns of queries in the database of queries.

9. The method of claim 1, wherein the analyzing comprises creating a test process and submitting one or more variations of the query to the test process to determine if the test process experiences a problem with the variations.

10. A system comprising:
    a processor configured to receive a query from a first system;
    a processor configured to compare the query against a database of queries;
    a processor configured to transmit the query to a second system if the query is not found in the database of queries;
    a processor configured to write the query to a backup system if the query is not found in the database of queries;

a processor configured to block the transmission of the query to the second system if the query is found in the database of queries;

a processor configured to analyze the query when the query causes a problem on the second system; and a processor configured to generate rules relating to the query.

11. The system of claim 10, wherein the database of queries comprises one or more queries that at a prior time caused a problem on the second system.

12. The system of claim 10, wherein the first system is a client system and the second system is a server system.

13. The system of claim 10, further comprising a processor configured to monitor the second system to determine if the second system experiences a problem after receiving the query.

14. The system of claim 13, further comprising a processor configured to write the query to the database of queries if the second system experiences a problem after receiving the query.

15. The system of claim 10, wherein the processor configured to compare the query against the database of queries further comprises a module to check one or more hex patterns of the query against hex patterns of queries in the database of queries.

16. A machine readable medium with instructions thereon for executing a process comprising:

receiving a query from a first system;

comparing the query against a database of queries;

transmitting the query to a second system if the query is not found in the database of queries;

writing the query to a backup system if the query is not found in the database of queries;

blocking the transmission of the query to the second system if the query is found in the database of queries;

analyzing the query when the query causes a problem on the second system; and generating rules relating to the query.

17. The machine readable medium of claim 16, wherein the database of queries comprises one or more queries that at a prior time caused a problem on the second system.

18. The machine readable medium of claim 16, further comprising monitoring the second system to determine if the second system experiences a problem after receiving the query.

19. The machine readable medium of claim 16, further comprising writing the query to the database of queries if the second system experiences a problem after receiving the query.

20. The machine readable medium of claim 16, wherein comparing the query against the database of queries comprises checking one or more hex patterns of the query against hex patterns of queries in the database of queries; and analyzing comprises creating a test process and submitting one or more variations of the query to the test process to determine if the test process experiences a problem with the variations.

* * * * *